United States Patent [19]

Bowler

[11] Patent Number: 5,046,432
[45] Date of Patent: Sep. 10, 1991

[54] UNLOADING GATE FOR BULK MATERIAL HANDLING CONTAINERS

[75] Inventor: Bert J. Bowler, Regina, Canada

[73] Assignee: DeGelman Industries Limited, Regina, Canada

[21] Appl. No.: 353,394

[22] Filed: May 17, 1989

[30] Foreign Application Priority Data

Apr. 28, 1989 [CA] Canada .................. 598280

[51] Int. Cl.⁵ .................. B61D 7/26; B61D 7/20
[52] U.S. Cl. .................. 105/282.1; 105/308.1
[58] Field of Search .................. 105/253, 282.1–282.3, 105/308.1

[56] References Cited

U.S. PATENT DOCUMENTS

| | | | |
|---|---|---|---|
| 2,072,292 | 6/1933 | Campbell | 105/282.1 |
| 3,109,388 | 11/1963 | Dorey | 105/253 |
| 3,110,270 | 11/1963 | Ingram | 105/253 |
| 3,255,714 | 6/1966 | Dorey | 105/253 |
| 3,933,100 | 1/1976 | Dugge | 105/282.3 |
| 4,344,365 | 8/1982 | Fritz et al. | 105/282.2 |
| 4,475,672 | 10/1984 | Whitehead | 105/282.3 X |

Primary Examiner—Robert P. Olszewski
Assistant Examiner—A. Muratori

[57] ABSTRACT

A gate mechanism for a bulk material handling container such as a railway hopper car. The gate mechanism comprises a chute attached to the bottom of the hopper and having a discharge opening, a frame attached to the side of the chute, a gate slide mounted within the frame, a slider for providing a low friction, non-metallic contact surface between the gate slide and the frame, a drive mechanism for opening and closing the gate slide, a seal for preventing any discharge through the closed discharge opening, and a lock for securing the gate slide in a closed position. The slider comprises elongated bodies made of solid bars of non-metallic, low friction material such as Teflon (trade mark), and provides a non-corroding, easily maintainable method for the smooth opening and closing of the discharge opening. The lock comprises a shaped spring bar made of resilient metal, which provides a simple and automatic means of holding the gate slide closed.

15 Claims, 3 Drawing Sheets

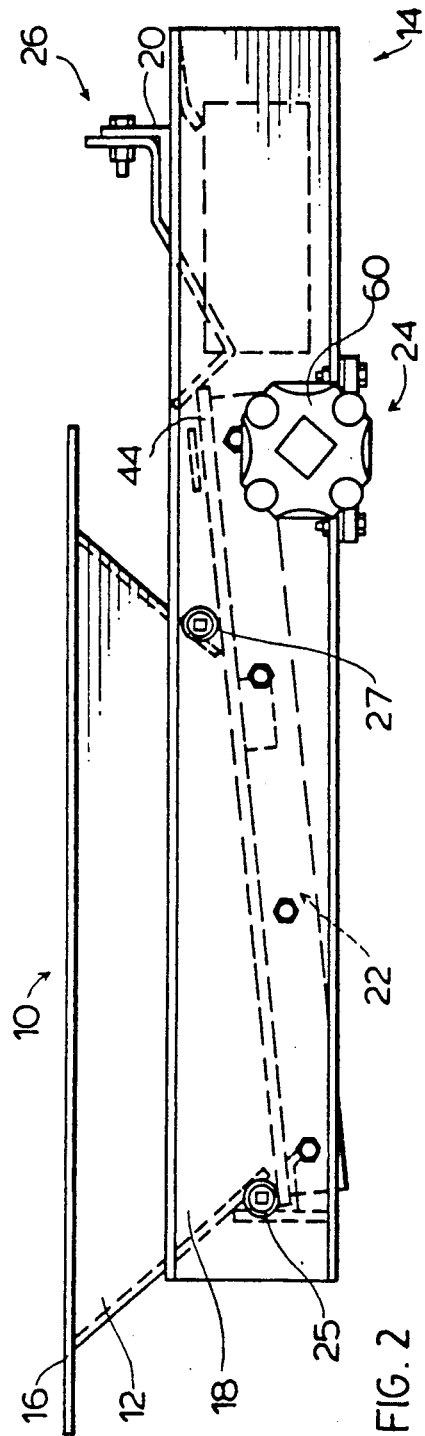
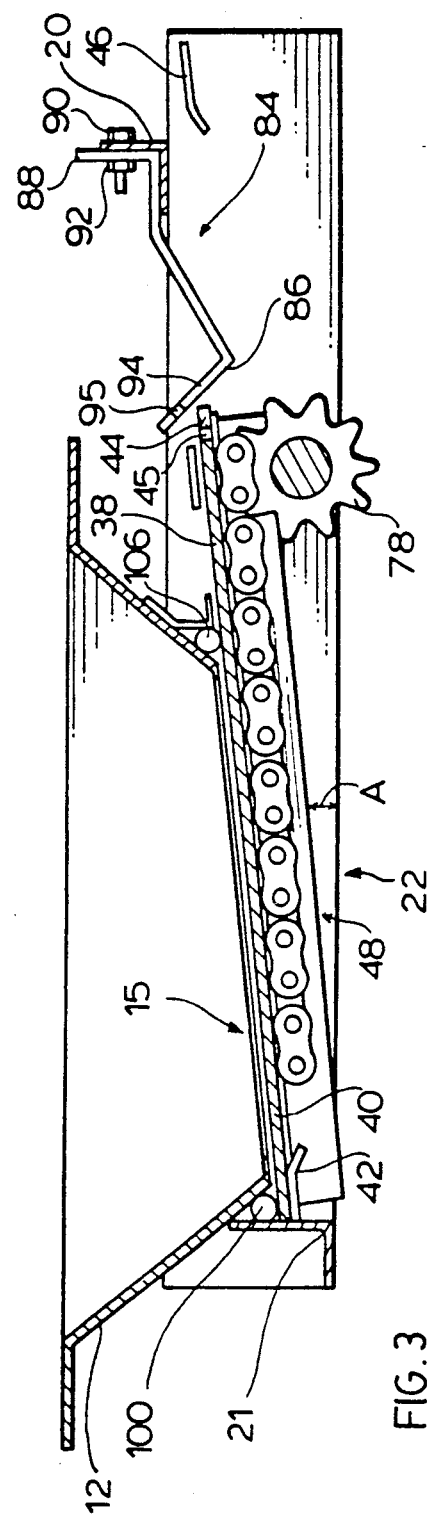

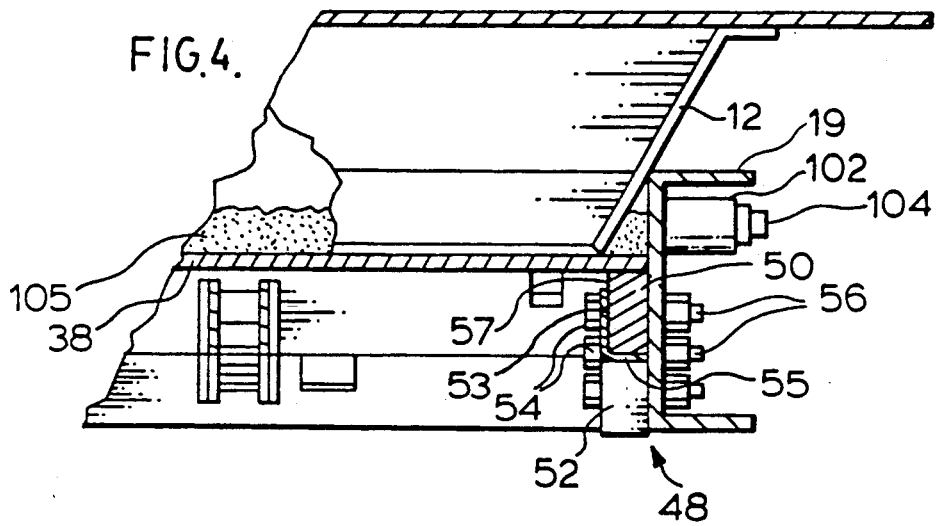
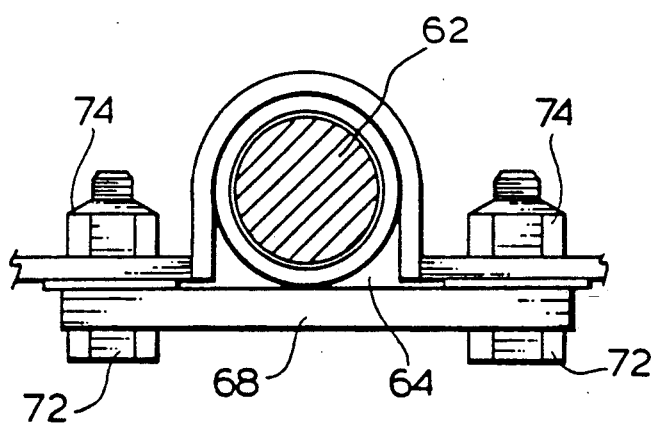

UNLOADING GATE FOR BULK MATERIAL HANDLING CONTAINERS

FIELD OF THE INVENTION

This invention relates to an unloading gate for a bulk material handling container such as a gravity discharge hopper and more particularly, to a railway hopper car gate.

BACKGROUND OF THE INVENTION

Conventional hopper car outlet gate arrangements have included a frame which is fastened to the underside of the hopper car. The frame encloses a door slide or gate slide which is permitted to slide horizontally in the frame between the open and closed positions. A rack and pinion or other mechanical means is employed to gain a mechanical advantage in sliding the gate slide between the open and closed postions. The gate slide itself has ordinarily been formed from steel. The gate is, therefore, usually quite heavy and prone to corrosion. Furthermore, the weight of the material within the hopper car tends to press against the gate slide with great force. The gate slide has ordinarily been supported within the frame by the use of rollers or metal slide rails. Resilient seals have often been employed to seal the gate tightly in its closed position and prevent the unintentional discharge of materials through the gate. The gate slide is usually held firmly in its closed position by the use of gravity actuated locking dogs.

One of the problems with the prior art is that corrosion of the metal gate slide, or corrosion of the metal rollers supporting the gate slide, prevents the gate slide from opening or closing smoothly. Some gates have used bushings or linings made of a low friction material such as Teflon (trade mark) in place of rollers in order to avoid the problems associated with corrosion. These low friction bushings or linings, however, tend to wear out quickly and tend to be difficult to replace. Another problem with the prior art relates to the locking mechanisms employed. The locking mechanisms tend to corrode and jam. Yet another problem with the prior art is that the sealing mechanism used tends to be inefficient and difficult to repair. The present invention contemplates an improved slide gate which overcomes all of the above problems.

SUMMARY OF THE INVENTION

In accordance with the invention, the gate mechanism comprises a chute having downwardly inclined side and end walls defining a discharge opening. A metal frame composed of longitudinal and transverse frame members is attached to the outside walls of the chute. Contained within the frame, and lying immediately below the discharge opening, is a gate slide for the opening and closing of the discharge opening. The gate slide rests upon slider means. In the preferred embodiment, the slider means is composed of one or more elongated bodies which are supported in the frame by bracket means made attachable to the frame. Surrounding the discharge opening and in close proximity to the gate slide are sealing means. The gate slide is slidingly moveable between its fully closed position and its open position. An automatic locking means locks the slide gate in its fully closed position.

The elongated bodies may be of a polymeric material such as Teflon, nylon or of some other composite low friction material. The elongated bodies may be of a variable thickness. The bracket means comprises L-shaped brackets or angle irons which sandwich the elongated bodies to the frame. The elongated bodies may be secured to the bracket means by various means including, but not limited to, bolts which extend through the bracket, the elongated body and the frame; the bolts being then secured by the use of metal nuts. The brackets protect the elongated bodies from damage which may be caused by the discharge of materials through the gate or the by application of excessive pressure onto the elongated body from the gate slide.

A principal advantage of the present invention is that the elongated bodies, being made of a non-metallic low friction material, cannot corrode and, therefore, permit the gate slide to open and close freely without sticking or jamming. The elongated bodies can be made very thick in order to withstand heavy loads and long periods of wear. When the elongated bodies eventually wear down, they can easily be replaced. Furthermore, material does not accumulate upon the elongated bodies due to their position within the gate mechanism.

Another advantage to the invention is that the sealing means provides an efficient and cost effective means of sealing the discharge opening while the gate slide is in its fully closed position.

Yet another advantage of the invention is that the locking means is automatic and incorporates few moving parts. The locking means, therefore, is both reliable and cost efficient. The locking means further provides a convenient means of sealing the gate in its closed position by affixing a wire seal to the lock means.

Still further advantages will become apparent to those of ordinary skill in the art upon reading the following detailed description of the preferred embodiment.

BRIEF DESCRIPTION OF THE DRAWINGS

FIG. 2 is a side elevation of the gate mechanism shown in FIG. 1 constructed in accordance with the principles of this invention with the gate in the closed position.

FIG. 3 is a sectional view taken along line A—A of FIG. 1.

FIG. 4 is a partial sectional view taken along line B—B of FIG. 1.

FIG. 5 is a partial sectional veiw taken along line C—C of FIG. 1.

DETAILED DESCRIPTION OF THE PREFERRED EMBODIMENT

Figure 1:
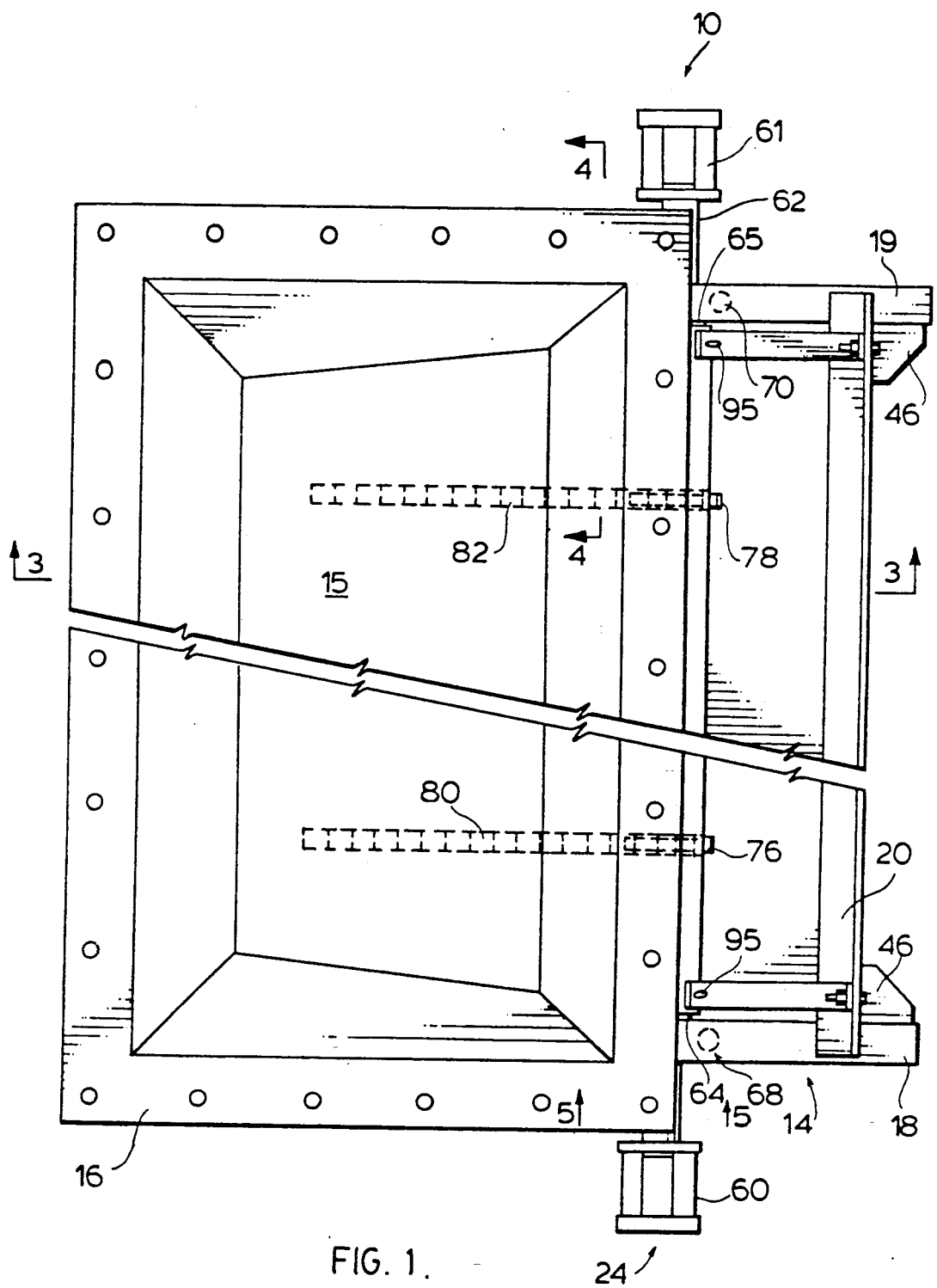
FIG. 1 is a top plan view of a gate mechanism constructed in accordance with the principles of this invention with the gate in its fully closed position.

With primary reference to FIGS. 1 and 2, the gate mechanism of the present invention shown generally as 10 comprises a chute 12 and a frame 14. Chute 12 has an opening 15 for the discharge of materials through the chute and a top flange 16 for attaching the chute to the underside of the hopper of a rail car, semi-trailer truck, or the like. Frame 14 includes side frame members 18 and 19 attached to the side of chute 12 and transversely extending support members 20 and 21. Gate mechanism 10 also comprises gate means shown generally as 22, drive means shown generally as 24, lock means shown generally as 26 and sealing means shown generally as 25 and 27.

With primary reference to FIGS. 3 and 4, the gate means, shown generally as 22, comprises a gate slide 38 slidingly mounted within frame 14 and free to move between closed and open positions. The rear edge 40 of gate slide 38 is supported by rear support member 42 when gate slide 38 is in its closed position. When gate slide 38 is in its open position the gate slides leading edge 44 is supported by forward support member 46. When gate slide 38 is its closed position the upper surface of gate slide 38 partially seals discharge opening 15 by physically touching the lower edges of chute 12.

Gate slide 38 is supported along both its side edges by slider means shown generally as 48. Slider means 48 comprises elongated bodies 50, each of which is made of a solid bar of non-metallic low friction material such as Teflon or nylon. The elongated bodies 50 are supported and secured to their respective side frame members 18 and 19 by bracket means 52. Bolts 54 and nuts 56 secure the slider means 48 to their respective side frame members 18 and 19. Slider means 48 are mounted to side frame members 18 and 19 at an angle A from the horizontal.

Bracket means 52 is composed of two L-shaped brackets each having side portion 53 and bottom portion 55. Elongated body 50 is sandwiched between side portion 53 and the side frame members 18 or 19. The height of side portion 53 is less than the height of elongated body 50 so that top portion 57 of elongnated body 50 is exposed for contact with gate slide 38.

Gate slide 38 moves along the elongated bodies 50 in a sliding fashion with little friction due to the low friction nature of the elongated bodies 50. The elongated low friction bodies, being non-metallic, do not corrode and, therefore, gate slide 38 does not stick or adhere to the elongated bodies 50. The elongated bodies, being a solid bar of low friction material, rather than a thin lining of material, can support heavy loads upon gate slide 38 without wearing down quickly. When top portion 57 of elongated bodies 50 wears down, elongated body 50 can be easily replaced by first removing nuts 56 and bolts 54 and then removing brace means 52.

The elongated bodies 50 also act as seals preventing the discharge of materials along the side edges of gate slide 38. The elongated low friction bodies 50, being positioned below chute 12 and to the sides of opening 15, do not accumulate material by the discharge of material through opening 15.

Referring to FIGS. 1, 2 and 5 the drive means comprises cranks 60 and 61 which are mounted at the ends of crank shaft 62. Crank shaft 62 runs though openings 64 and 65 in side frame members 18 and 19 respectively, and transversely travels the width of frame 14 below gate means 22. Crank shaft 62 is supported by support members 68 and 70 which are located directly beneath opening 64 and 65 respectively. Nuts 74 and bolts 72 secure support members 68 and 70 to frame side members 18 and 19 respectively.

Referring now to FIGS. 1 and 3 the drive means further comprises sprockets 76 and 78 located along crank shaft 62. Chains 80 and 82 are rigidly attached to the underside of gate slide 38 and run parallel to frame side members 18 and 19. When gate slide 38 is in its closed position, chains 80 and 82 engage sprockets 76 and 78 respectively at a point slightly behind leading edge 44 of gate slide 38. When crank 60 or 61 is turned, crank shaft 62 is made to spin on its axis which in turn causes sprockets 76 and 78 to revolve on their axis. The revolving of sprockets 76 and 78 causes chain 80 and 82, together with gate slide 38, to move.

As best shown in FIG. 3, lock means 26 comprises spring bar 84 which is made of a resilient metal having a V-shaped free end 86 and a fixed end 88. Fixed end 88 of spring bar 84 is mounted to the transversely extending support member 20 by means of bolt 90 and nut 92. While gate slide 38 is in its closed position the outer arm 94 of V-shaped free end 86 bears against the leading edge 44 of gate slide 38 with sufficient force to keep gate slide 38 in its closed position. When gate slide 38 moves towards its open position from its closed position by the operation of drive means 24, the force exerted by the leading edge 44 of gate slide 38 upon the outer arm 94 of spring bar 84 causes the displacement of free end 86 of the spring bar 84. When the free end 86 of spring bar 84 is fully displaced, gate slide 38 is free to move towards its fully open position. When gate slide 38 is moved towards its closed position from its open position, free end 86 of spring bar 84 recoils to its original position and the leading edge 44 of gate slide 38 again contacts the outer arm 94 of spring bar 84.

Again referring to FIG. 3, outer arm 94 of spring bar 84 is provided with aperture 95. Leading edge 44 of gate slide 38 is likewise provided with aperture 45. While gate slide 38 is in its closed position apertures 95 and 45 are aligned in close proximity, permitting the sealing of gate mechanism 10 by passing a wire seal through both aperturs 95 and 45.

Referring to FIGS. 3 and 4, rear sealing means 25 comprises a long rigid rod 100 running transversely between side frame members 18 and 19, directly in front of transverse frame member 21, directly behind the rear edge of chute opening 15 and directly above the rear edge 40 of gate slide 38 when gate slide 38 is in its closed position. Rigid rod 100 is covered by a lining of carpeting 105 and extends through openings in side frame members 18 and 19. Rigid rod 100 is held securely in place by pipes 102 and pipe plugs 104. Front sealing means 27 comprises a long rigid rod 106 which is covered by a lining of carpeting and travels transversely between side frame members 18 and 19, directly above gate slide 38, directly in front of the forward edge of chute opening 15. Rigid rod 106 extends through openings in side frame members 18 and 19 and is secured in place by additional pipes 102 and pipe plugs 104.

The invention has been described with reference to the preferred embodiment. Alterations and modifications, however, will occur to others upon reading and understanding this specification. All such alterations and modifications are within the scope of the present invention, which is defined by the following claims.

I claim:

1. A gate mechanism for selectively opening or closing a bulk material discharge container, comprising:
    (a) a chute attachable to the bottom of the container having downwardly inclined side walls and end walls defining a discharge opening;
    (b) a frame mounted to the side walls of the chute;
    (c) gate means mounted on the frame for selectively opening and closing the discharge opening, including a gate slide;
    (d) slider means mounted to the frame for providing a non-metalic low friction contact surface between the gate slide and the frame, comprising a pair of elongated bodies each composed of a solid bar of non-metalic low friction material, and bracket means mounted to the opposite sides of the frame for supporting and securing the elongated bodies to the frame, wherein the bracket means comprises a pair of long angular brackets each running the length of the elongated bodies, said brackets being L-shaped in cross-section and having a lower portion and a side portion, each of said brackets being mounted to the frame so as to sandwich one of the elongated bodies between the side portion of the bracket and the side of the frame;

(e) drive means for moving the gate slide between an open position and a closed position; and (f) lock means for locking the gate slide in the closed position.

2. A gate mechanism as defined in claim 1, wherein the brackets each have two or more apertures along its side portions, and the elongated bodies have corresponding apertures along their length, such that each elongated body may be secured between the sides of the frame and the side portion of one of the brackets by fasteners passing through said apertures.

3. A gate mechanism as defined in claim 2, wherein the brackets each have two or more apertures along its side portions, and the elongated bodies have corresponding apertures along their length, such that each elongated body may be secured between the sides of the frame and the side portion of one of the brackets by fasteners passing through said apertures.

4. A gate mechanism as decribed in claim 1, wherein the frame is mounted part-way up the sides of the chute and the slider means is mounted at a location beneath the chute and to the side of the discharge opening, the discharge opening being sealed by the physical contact of the gate slide with the chute while the gate slide is in its closed position, and by the slider means mounted beneath the side edges of the gate slide.

5. A gate mechanism for selectively opening or closing a bulk material discharge container, comprising:
 (a) a chute attachable to the bottom of the container having downwardly inclined side walls and end walls defining a discharge opening;
 (b) a frame mounted to the side walls of the chute;
 (c) gate means mounted on the frame for selectively opening and closing the discharge opening, including a gate slide;
 (d) slider means mounted to the frame for providing a non-metalic low friction contact surface between the gate slide and the frame, comprising a pair of elongated bodies each composed of a solid bar of non-metalic low friction material, and bracket means mounted to the opposite sides of the frame for supporting and securing the elongated bodies to the frame;
 (e) drive means for moving the gate slide between an open position and a closed position;
 (f) lock means for locking the gate slide in the closed position; and
 (g) sealing means for preventing the unwanted discharge of materials through the fully closed discharge opening, the sealing means including a long rigid rod lined by carpeting mounted to the frame at a position outside the chute immediately above the gate slide next to the front edge of the discharge opening.

6. The gate mechanism as defined in claim 5 wherein the sealing means comprises a second rod lined by carpeting mounted to the frame outside the back edges of the chute adjacent the discharge opening so as to engage the gate slide when it is in a closed position.

7. A gate mechanism for selectively opening or closing a hopper, comprising:
 (a) a chute attachable to the bottom of the hopper having downwardly inclined side walls and end walls defining a discharge opening;
 (b) a frame mounted to the side walls of the chute;
 (c) gate means mounted to the frame for selectively opening and closing the discharge opening, including a gate slide;
 (d) slider means mounted to the frame for providing a non-metalic low frinction contact surface between the gate slide and the frame;
 (e) drive means for moving the gate slide between an open position and a closed position; and
 (f) lock means for locking the gate slide in the closed position wherein the lock means comprises a shaped spring bar made of resilient metal mounted to the frame such that the spring bar is in physical contact with the leading edge of the gate slide while the gate slide is in its fully closed position, wherein the spring bar applies sufficient force to the leading edge of the gate slide to keep it in its closed position, and wherein the spring bar is shaped so that it can be deflected out of the way when the gate slide is moved towards an open position by operation of the drive means.

8. A gate mechanism defined in claim 7, wherein the spring bar has a fixed end and a free end, the spring bar being mounted by its fixed end to the frame, wherein its free end is V-shaped, with the outer arm of the V adapted to bear against the leading edge of the gate slide at an angle while the gate slide is fully closed.

9. A gate mechanism as defined in claim 8, wherein the outer arm of the spring bar and the leading edge of the gate slide are each provided with apertures, said apertures being of sufficient diameter and being so oriented so as to allow the passage of a wire seal therethrough.

10. A gate mechanism as defined in claim 7, wherein the slider means comprises a pair of elongated low friction bodies each composed of a solid bar of non-metalic low friction material, and bracket means mounted to opposite sides of the frame for supporting and securing the elongated low friction bodies to the frame.

11. A gate mechanism as defined in claim 7, further comprising sealing means for preventing the unwanted discharge of materials through the fully closed discharge opening, the sealing means including a long rigid rod lined by carpeting mounted to the frame at a position outside the chute immediately above the gate slide next to the front edge of the discharge opening.

12. The gate mechanism as set forth in claim 11, wherein the sealing means comprises a second rod lined by carpeting mounted to the frame outside the back edges of the chute adjacent to the discharge opening so as to engage the gate slide when it is in its closed position.

13. A gate mechanism for selectively opening or closing a hopper comprising a chute attachable to the bottom of a hopper having downwardly inclined side walls and end walls defining a discharge opening;
 (a) a frame mounted to the side walls of the chute;
 (b) gate means mounted on the frame for selectively opening and closing the discharge opening, including a gate slide;
 (c) slider means mounted to the frame for providing a non-metalic low friction contact surface between the gate slide and the frame comprising a pair of elongated bodies each composed of a solid bar of non-metalic low friction material, and bracket means mounted to opposite sides of the frame for supporting and securing the elongated low friction bodies to the frame;

(d) said slider means being mounted at a location beneath the chute and to the side of the discharge opening, the discharge opening being sealed by the physical contact of the gate slide with the chute while the gate slide is in a closed position and by the slider means mounted beneath the side edges of the gate slide;

(e) drive means for moving the gate slide between an open position and a closed position;

(f) lock means for locking the gate slide in the closed position, the lock means comprising a shaped spring bar made of resilient metal mounted to the frame such that the spring bar is in physical contact with the leading edge of the gate slide while the gate slide is in its fully closed position, wherein the spring bar applies sufficient force to the leading edge of the gate slide to keep it in its closed position, and wherein the spring bar is shaped so that it can be deflected out of the way when the gate slide is moved towards its open position by operation of the drive means; and (g) and a sealing means for preventing the unwanted discharge of materials through the fully closed discharge opening, the sealing means comprising a pair of long rigid rods lined by carpeting mounted to the frame immediately above the gate slide and in close proximity to front and rear edges of the discharge opening.

14. A gate mechanism for selectively opening or closing a hopper, comprising:

a chute attachable to the bottom of the hopper having downwardly inclined side walls and end walls defining a discharge opening;

a frame mounted to the side walls of the chute;

gate means mounted to the frame for selectively opening and closing the discharge opening, including a gate slide;

slider means mounted to the frame for providing a non-metallic low friction contact surface between the gate slide and the frame;

drive means for moving the gate slide between an open position and a closed position; and lock means for locking the gate slide in the closed position wherein the lock means comprises a shaped spring bar made of resilient metal mounted to the frame such that the spring bar is releasably secured to a portion of the gate slide while the gate slide is in its fully closed position, wherein the spring bar applies sufficient force to the said portion of the gate slide to keep it in its closed position, and wherein the spring bar is shaped so that it can be deflected out of the way when the gate slide is moved towards an open position by operation of the drive means.

15. A gate mechanism defined in claim 14, wherein the spring bar has a fixed end and a free end, the spring bar being mounted by its fixed end to the frame, wherein its free end is V-shaped, with the outer arm of the V adapted to bear against the portion of the gate slide at an angle while the gate slide is fully closed.

* * * * *